May 22, 1945. H. GALLUSSER 2,376,680

CONTROL DEVICE FOR COMPRESSED AIR BRAKES

Filed Sept. 24, 1942

INVENTOR
*Hans Gallusser,*
BY
ATTORNEYS.

Patented May 22, 1945

2,376,680

UNITED STATES PATENT OFFICE 2,376,680

CONTROL DEVICE FOR COMPRESSED AIR BRAKES

Hans Gallusser, Geneva, Switzerland

Application September 24, 1942, Serial No. 459,578
In Switzerland July 23, 1941

8 Claims. (Cl. 303—60)

Several constructions of control devices for operating compressed air brakes have already been proposed. These constructions comprise one or more slide valves which function as regulating members and are subjected to the pressure prevailing in the piping connected thereto. Such constructions involving slide valves are fairly complicated and of expensive manufacture.

An object of the present invention is to provide a control device for the aforesaid purpose adapted to fulfil the requirements laid down by railroad and like international regulations and having a new and simplified construction comprising simple valve units and lending itself to cheaper manufacture and upkeep.

Another object of the invention is to provide a control device which while having a novel structure is analogous to compressed air operated valve systems of the known Westinghouse, Knorr, Trollshammer or Breda types since it so functions that the braking pressure becomes operatively responsive to a pressure drop in the main piping serving the brakes, the rate of increase of said braking pressure from a predetermined value being slow for goods trains, safety means being provided to prevent any undue application of the brake if somehow the piping becomes untight, said control device being tripped into operation by a difference of pressure between said main piping and a control tank.

A further object of the invention is to provide a new control device for railroad vehicle brakes operated by air pressure factors in a common piping serving all said brakes, said device comprising in combination at least three interconnected valve units, preferably juxtaposed into a self contained assembly, the setting of each of these valve units to automatically put up with the momentary operative conditions resulting from the difference of pressure between two chambers or spaces provided therein and sealed off by a movable air tight partition or diaphragm.

With these and such other objects in view as will incidentally appear hereafter, the invention comprises the novel construction, combination and arrangement of parts that will be more fully described in the continuation of this specification with reference to the accompanying diagrammatic drawing exemplifying a constructional embodiment of the invention and forming a part of the present disclosure.

Figure 1:
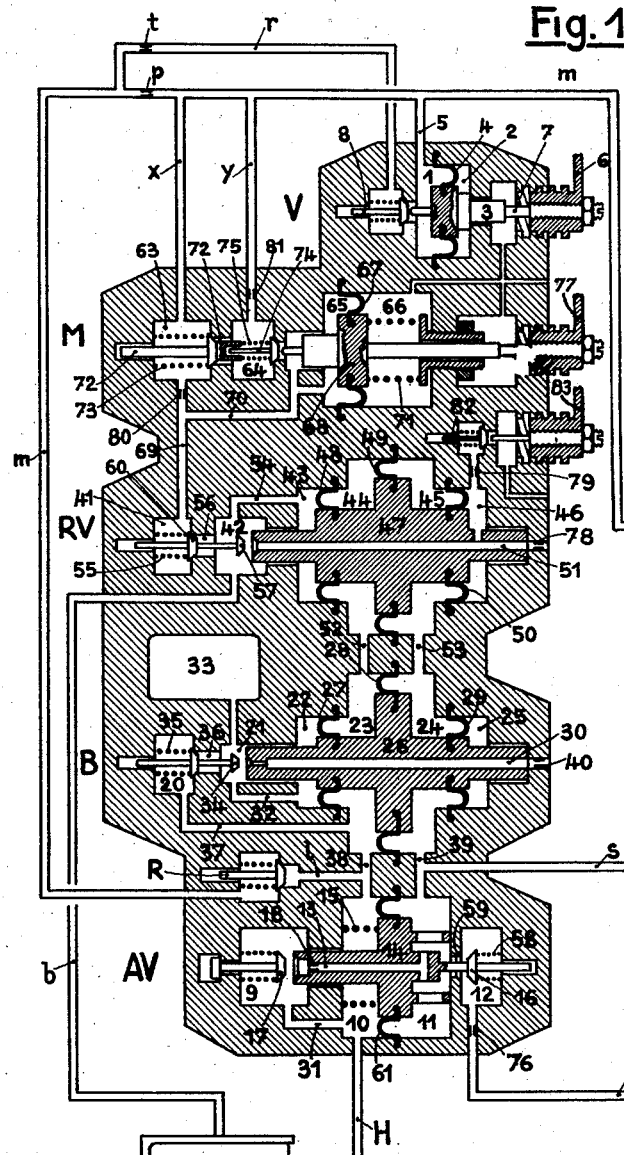
Figure 1 is a sectional view of the control device shown in its entirety, this view being taken assuming the device to have been rocked up counter-clockwise to an angular extent of 90° from its normal operative position.

The control device shown in the drawing is made up of five valve units V, AV, B, RV and M which will be referred to hereafter as the time-adjusting valve unit, the equalizing valve unit, the accelerating valve unit, the regulating valve unit and the pressure delivery valve unit.

Each valve unit comprises several chambers sealed from one another by air-tight resilient membranes each of which controls the motions of a valve member. Such motions are due to a difference of pressure between two juxtaposed chambers (shown superimposed in Fig. 1) and cause the individual valves to be closed or opened.

The construction and arrangement will be hereafter separately described in connection with each of the five valve units.

Compressed air from the main pipe H passes through a pipe $m$ and a non-return valve R and reaches a pressure tank L.

As for goods trains filling of the air tank L must be slower than for passenger or express trains, there is provided another valve unit V by means of which the filling time can be set to two different adjustments.

The time-adjusting valve unit V comprises an axially movable valve member 3 operated by a resilient membrane 4. Said membrane forms an air-tight seal between the chambers 1 and 2. A pipe 5 connects the chamber 1 to the pipe $m$. Between the non-return valve R and the pipe 5, the pipe $m$ has a throttle $p$.

The chamber 2 permanently communicates with the atmosphere. A lever 6 having a threaded boss actuates a pin 7 which operates a spring-urged valve 8 through the valve member 3. A pipe $r$ interconnects the chamber of the valve 8 and the pipe $m$ and has a throttle $t$. When the valve 8 is moved off its seat, compressed air can also flow through the throttle $t$, pipe $r$, valve 8 and pipe 5 to the air tank, thereby shortening the filling time.

The equalizing valve unit AV is formed with four superimposed or sequentially arranged pressure chambers 9, 10, 11, 12 and provided with a movable valve member 14 having a stepped outline. The chamber 10 is permanently connected to the main pipe H. The valve member 14 is axially movable and has a bore 13 providing communication between the chambers 9, 11. Said valve member 14 is carried by a resilient annular membrane 61 which yieldingly encompasses its periphery and is urged towards a resiliently supported seat-like valve 16 by a coil spring 15. Should the valve member 14 be upwardly pressed against the action of the spring 15 by the pressure prevailing in the chambers 10, 11, said valve member comes into contact with a seat 17 which closes off the upper end of the bore 13. This motion of the valve member 14 also causes an opening 59 to be closed by the valve 16 under the push of a spring 58.

The chamber 12 is connected through a pipe $k$ having a throttle 76 with the compressed air tank L. The function ascribed to the throttle 76 is to prevent equalization between the tank L and the control container S from taking place too fast and the pressure in said control container from dropping too fast. A duct 31 interconnects the chambers 9, 10.

The accelerating valve unit B is formed with six sequentially arranged pressure chambers 20, 21, 22, 23, 24, 25 and provided with a movable valve member 26 carrying three resilient annular membranes 27, 28, 29. This valve member 26 has an axial bore 30 which interconnects the chamber 21 and the outer atmosphere. The chamber 21 is in permanent communication with an expansion chamber 33 and through a duct 32 with the chamber 22.

Should the valve member 26 be upwardly pushed under the action of the pressures prevailing in the chambers, the upper end of the bore 30 is closed by a resiliently supported seat 34. If said pressures are sufficient to move this seat 34 against the action of a spring 35, a duct 36 is opened, said duct interconnecting the chambers 20, 21. The chambers 20, 23 communicate through a duct 37, while the chambers 10, 23 and 11, 24 are respectively interconnected by ducts 38, 39. The duct 39 is connected by a pipe $s$ with the control tank S. A port 40 having a throttle provides communication between the chamber 25 and the outer atmosphere.

The regulating valve unit RV is formed with six sequentially arranged pressure chambers 41, 42, 43, 44, 45, 46 and a movable valve member 47 carried by three annular membranes 48, 49, 50. Said member 47 has a bore 51 which connects the chamber 42 to the outer atmosphere through a port having a throttle 78. The purpose of the latter is to adjust the emptying time when the brakes on a goods train are released so as to avoid jerks.

The chambers 44, 23 are interconnected by a duct 52 while the chambers 45, 24 and 42, 43 are similarly interconnected by ducts 53, 54 respectively. The chamber 46 communicates with the bore 51.

If the pressures which prevail in the chambers move the valve member 47 (in Fig. 1) upwardly, the upper end of the bore 51 is first closed by a resiliently supported seat 57 which is then moved on against the action of a spring 55, whereupon a valve plate 60 rigidly connected thereto opens the port 56 which interconnects the chambers 42, 41.

A connecting pipe $b$ provides communication between the chamber 42 and the brake cylinder BZ.

A minimum pressure delivery valve unit M is formed with four sequentially arranged pressure chambers 63, 64, 65, 66 and provided with a valve member 68 carried by a resilient annular membrane 67. The tendency of this valve unit M is to maintain a minimum pressure in the pipe leading to the brake cylinder BZ by feeding the same either through the pipes $x$, 69 only or through the pipes $x$, 69, $y$, 70 or else through the duct $x$ and opened valve 72. The valve member 68 is urged by a spring 71. The chamber 63 communicates with the chamber of the regulating valve unit 41 through a duct 69. The chambers 63, 64 are connected with the pipe $m$ and compressed air tank L by pipes $x$, $y$ respectively. The lowermost chamber 66 is in permanent communication with the outer atmosphere, while the next chamber 65 is connected by a duct 70 with the duct 69.

In the chambers 63, 64 are respectively provided valve members 72, 74. Both valve members are subjected to the action of springs 73, 75, the spring 73 being weaker than the spring 75.

A lever 77 having a threaded boss permits an upward motion to be imparted to the valve member 68. This motion first causes the valve member 74 to be opened, thereby establishing a communication between the chambers 64, 65, so that compressed air is permitted to flow into the chamber 41 not only through the pipe $x$ but also through the piping $y$—70. The air feed is checked by the throttles 80, 81. Should the motion be continued, the valve member 74 strikes the valve member 72 so that a free communication is set up between the chambers 63, 41 through the chamber 64 and the ducts 70, 69.

The operation of the aforesaid device takes place as follows:

Assuming the main pipe H to be under pressure (say a normal pressure equal to 5 kilograms per square centimeter) the chambers 10, 23, 44 are simultaneously placed under pressure, so that the valve members 14, 26, 47 are pressed downwardly. The compressed air can thus flow through the chamber 10, duct 1 and past the non-return valve R into the tank L. Compressed air simultaneously passes through the duct 31 into the chamber 9 and thence through the bore 13 of the valve member 14 into the chambers 11, 24, 45 and through the pipe $s$ into the control tank S.

The tanks L, S can thus be filled up. If pressure therein rises to say 5 kilograms per square centimeter, the pressure which prevails in the chambers 11, 24, 45 connected thereto is equal to that which prevails in the chambers 10, 23, 44 located above them and communicating with the main pipe H. Consequently the non-return valve R is closed by the action of its own spring and cuts off the connection between the pressure tank L and the main pipe H. However, the valve members 14, 26, 47 belonging to the three regulating valve units, to wit the equalizing valve unit, the accelerating valve unit and the regulating valve unit proper remain in the illustrated position without moving. A communication is then preserved between the main pipe H and the tanks L, S through the bore 13 of the valve member 14 of the equalizing valve unit and the pipes $k$, $s$. The bore 13 is so throttled at 18 as to prevent more than a restricted air quantity to flow from the tanks L, S back into the main pipe H in a time unit, thereby equalizing small air losses as occur in said main pipe due to imperfect tightness.

As is known, international regulations for brakes of goods trains provide that where a pressure drop of .3 kilogram per square centimeter takes place for one minute in the main pipe, the application of the brake should not be initiated. Therefore the throttle 18 in the valve member 13 should be so accurately gaged as to allow pressure equalization to take place between the chambers 11, 24, 45 and between the chambers 10, 23, 44 without starting any braking action. The aforesaid regulations further provide that the application of the brake should be initiated when somehow the pressure in the main pipe drops by .6 kilograms per square centimeter for six seconds. Therefore the throttle 18 in the valve member 13 should be, moreover, correspondingly gaged so as to check in such an event the flow of enough compressed air. It follows that the pressure in the chamber 10 decreases quicker than the pressure in the chamber 11 and that the valve member 14 of the equalizing valve unit is lifted. When it strikes the seat 17, the flared mouth of the duct 13 is closed off while at the same time the valve member 16 is applied upon its seat, thereby interrupting communication between the tanks L and S and between them and the main pipe H. As the chambers 10, 23, 44 are in direct communication, the pressure drop therein is the same as in the main pipe.

The valve members 14, 26, 47 of the three regulating elements are upwardly moved.

Owing to this motion of the valve member 26 belonging to the valve unit B, the bore 30 which provides communication between the chamber 21 and the outer atmosphere is first closed off, whereafter the valve member 34 is pressed upwardly and the opening 36 is released. This enables compressed air from the chamber 23 to be relieved into the chambers 21, 22, 33 and causes a new pressure drop in the main pipe. This pressure relief causes an acceleration of the transmission in the pressure reduction from one car to another in the train. The extent of this acceleration is dependent upon that of the expansion chamber 33 which latter can be measured according to the required acceleration.

Owing to the inflow of compressed air into the chamber 22 the latter is placed under pressure and just as soon as the latter together with the pressure in the chamber 23 and the action of the spring 35 is large enough, the valve member 26 is moved downwardly against the pressure prevailing in the chamber 24. The opening 36 is thus closed off. However, at this time, the action of the spring 35 ceases and the valve member 26 can no longer be moved so that the communication between the chamber 21 and the outer atmosphere is cut off.

Following the pressure drop in the chamber 44 of the regulating valve unit, the communication between the chamber 42 and the outer atmosphere through the bore 51 is interrupted. Should the pressure drop be large enough, the valve plate 60 is unseated, whereby compressed air from the tank L can flow through the pipe $x$ into the chamber 63 of the delivery valve unit and thence through the pipe 69 into the chambers 41, 42 of the regulating valve unit and through the pipe $b$ into the brake cylinder BZ. Moreover, the chambers 43 and 65 belonging to the regulating valve unit and to the delivery valve unit respectively are placed under pressure. Should the pressure rise in the brake cylinder BZ, the pressure also rises in the chamber 43 and acting in conjunction with the pressure in the chamber 44 and with the action of the spring 55 soon moves the valve member 47 downwardly against the action of the pressure in the chamber 45. This motion closes the valve plate 60, thereby cutting off any further supply of compressed air to the brake cylinder. As the action of the spring 55 is then discontinued upon the valve member, the latter remains in contact with its plate-like seat 60 so that communication between the chamber 42 and the outer atmosphere remains interrupted.

The duct 69 has a throttle 80 which considerably restricts the air feed to match the correspondingly large filling time. When the valve plate 60 is opened, the pressure in the duct 69 and in the chamber 65 drops to a very small extent so that the spring 71 moves the valve member 68 upwardly and opens both valve members 74, 72. This permits the non-throttled compressed air to gush through the chambers 63, 64 and duct 70 into the brake cylinder BZ. The strength of the spring 71 is so reckoned that as soon as a pressure of about .6 kilograms per square centimeter prevails in the brake cylinder, the valve member 68 is moved downwardly and the valve members 72, 74 are therefore closed.

Compressed air can henceforward only flow into the brake cylinder through the throttle 80. The bore of this throttle is so reckoned that the rise of pressure in the brake cylinder can only take place slowly and in accordance with international regulations laid down for the brakes of goods trains.

Should the pressure in the main pipe further drop, the equalizing valve unit AV remains stationary in its position while the valve member 26 is again moved upwardly in the accelerating valve unit and the valve member 47 is moved upwardly in the regulating valve unit so that the ducts 36, 56 are opened until countre-pressure in the chambers 22, 43 push the valve members 26, 47 downwardly and close back the ducts 36, 56. Therefore a step by step drop of the pressure in the main pipe permits a step by step braking to be achieved. Thus at each pressure drop the accelerating valve unit allows compressed air from the main pipe to flow into the chambers 21, 33 so that an acceleration of the transmission of the pressure drop from one car to another car in the train takes place not only when the brakes are applied for the first time but at each subsequent braking stage.

Should the pressure in the main pipe be increased, the total of the pressures in the chambers 23, 22 of the accelerating valve unit and in the chambers 43, 44 of the regulating valve unit will become larger than the pressure in the oppositely located chambers 24, 45. As a result of this, the valve members 26, 47 are moved downwardly and compressed air from the expansion chambers 21, 33 and from the brake cylinder can be released into the atmosphere through the bores 30, 51 until the pressure in the lower chambers 24, 45 has become larger than the total of the pressures in the chambers 22, 23 and 43, 44. In this case, the valve members 26, 47 which belong respectively to the accelerating valve unit and regulating valve unit are again moved upwardly and close back the bores 30, 51. By a step by step increase of the pressure in the piping, the brake can be also released step by step.

Assuming the pressure in the main pipe to rise for example to 4.8 kilograms per square centimeter, the valve member 14 of the equalizing valve unit is moved downwardly so that the valve head 16 is lifted from its seat while at the same time the flared mouth of the valve member 14 is moved off its resilient seat 17, thereby re-establishing communication between both compressed air tanks S, L and the main pipe and fully releasing the brake.

Such a control valve arrangement is also applicable to passenger trains and to express trains where the air must rapidly flow into the brake cylinder.

Figure 2:
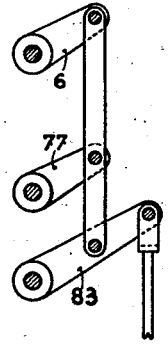
Figure 2 is a separate or fragmentary view showing a constructional detail of the device.

In order to ensure a shorter filling time for passenger trains, the lever 77 is rocked to such a sufficient extent that when the valve member 68 is pressed upwardly, the valve spindle 74 remains lifted from its seat. The pipe $x$ is then supplemented by the pipe $y$ so as to enhance the air feed and shorten the filling time. The throttle 81 permits the air feed to be accurately adjusted for brakes used on passenger trains. In the case of an express train where the filling time must be as short as possible, the lever 77 should be still further rocked so as to also keep the valve head 72 opened. In this case, the compressed air can flow into the brake cylinder BZ through a passage of larger cross sectional area and without being hampered. Where the brakes are applied to passenger or express trains, the air release must take place quicker when such brakes are released than when the brakes are applied to goods trains. To that effect, there is provided an additional valve spindle 82 whose chamber communicates with the chamber 46 through a throttle 79 and adapted to be opened by means of a rockable threaded lever 83. The three levers 6, 77, 83 are so interconnected by a suitable linkage or toggle as shown in Fig. 2 as to permit the entire control valve to be adjusted by a simple movement in order to serve goods trains or passenger trains or express trains.

It will be seen from the foregoing that while fulfilling all requirements laid down by international regulations for compressed air brakes, this improved control valve arrangement presents important advantages by comparison with known similar control devices.

One particular advantage is that to each valve unit is ascribed a particular function so that the operation of the entire device is easy to supervise or overhaul and is, moreover, safer and more simple and reliable. As the valve units can be arranged in spaced relationship near one another, each of them can be subjected to examination independently of the others without requiring dismantling of the control device.

Minor constructional details of the above-described valve arrangement can be altered of course without departing from the invention, for example as regards the constructional set up and the sequence of the several valve units which may be different from the ones shown. The resilient membranes can be made for example of rubber reinforced by inlaid fabric or else of thin metal or foil strips, all such variations being involved in the scope of the expression "resilient partitions" used hereafter.

What is claimed is:

1. A fluid pressure brake system, including, a control device in piped communication with a main pressure supply pipe, a pressure tank, a control tank and a brake cylinder; said control device, comprising, in combination, a valve unit equalizing pressure losses occurring in the main pipe, a second valve unit accelerating the transmission of pressure drop from one end to the other of the main pipe, and a third valve unit regulating the pressure rise in the brake cylinder responsive to pressure drop in the main pipe in cooperation with a pressure delivery valve means adapted to maintain a pre-determined minimum pressure in the pipe line to said brake cylinder, each valve unit having a movable valve element and flexible membrane defining a pair of chambers and movable responsive to pressure differences between said chambers, the set of chambers on one side of said membranes inter-communicating with the main pipe while the set of chambers on the opposite side of said membranes inter-communicates with the control tank, the second and third valve units each comprising a third air-tight chamber separated by a resilient membrane from the chamber communicating with the main pipe and communicating with the outer atmosphere through a valve adapted to be unseated when the brake is released, the automatic adjustment of each valve unit to variable operating conditions being effected by the difference of pressure on the opposite sides of the membranes of the said first, second, and third valve units.

2. A fluid pressure brake system, including, a control device in piped communication with a main pressure supply pipe, a pressure tank, a control tank, and a brake cylinder; said control device, comprising, in combination, a first valve unit equalizing pressure losses occuring in the main pipe, a second valve unit responsive to pressure drops in the main pipe adapted to accelerate the transmission of the pressure drop from one end to the other of the main pipe, and a third valve unit regulating the pressure rise in the brake cylinder responsive to pressure drop in the main pipe in cooperation with pressure delivery valve means, each valve unit having a flexible membrane defining primary and secondary chambers and movable responsive to pressure differences between said chambers, the set of primary chambers inter-communicating with the main pipe while the set of secondary chambers inter-communicates with the control tank, the second and third valve units each comprising a tertiary air-tight chamber separated by a flexible membrane from their primary chambers and communicating with the outer atmosphere through a valve adapted to be unseated when the brake is released, the third chamber of the second valve unit communicating with an expansion chamber, the automatic adjustment of each valve unit to variable operating conditions being effected by the difference of pressure prevailing between the primary and secondary chambers, the primary chamber of the second valve unit automatically communicating with the expansion chamber as soon as pressure drops in the main pipe, thereby causing the pressure to further drop therein.

3. A fluid pressure brake system, including, a control device in piped communication with a main pressure supply pipe, a pressure tank, a control tank, and a brake cylinder; said control device, comprising, in combination, a valve unit equalizing pressure losses occurring in the main pipe, a second valve unit accelerating the transmission of the pressure drop from one end to the other of the main pipe and including an expansion chamber, and a third valve unit regulating the pressure rise in the brake cylinder responsive to pressure drop in the main pipe in cooperation with a pressure delivery valve means adapted to maintain a pre-determined minimum pressure in the pipe line to said brake cylinder, each valve unit having a flexible membrane defining primary and secondary chambers and movable responsive to pressure differences between said chambers, the set of primary chambers inter-communicating with the main pipe while the set of secondary chambers inter-communicates with the control tank, the second and third valve units each comprising a tertiary air-tight chamber separated by a flexible membrane from their primary chambers and communicating with the outer atmosphere through a valve adapted to be unseated when the brake is released, the third chamber of the second valve unit communicating with the said expansion chamber thereof, the automatic adjustment of each valve unit to variable operating conditions being effected by the difference of pressure between the primary and secondary chambers thereof, and means responsive to pressure drops in the main pipe to cause a flow of compressed air therefrom into the expansion chamber so that where sequential pressure drops occur in said main pipe an acceleration of the pressure reduction is achieved, the tertiary chamber of the second valve unit providing an automatic communication with the expansion chamber and with its primary chamber as soon as pressure drops in the main pipe, thereby causing the pressure to further drop therein.

4. A fluid pressure brake system, including, a control device in piped communication with a main pressure supply pipe, a pressure tank, a control tank, and a brake cylinder; said control device, comprising, in combination, a valve unit equalizing pressure leakages occurring in the main pipe, a second valve unit accelerating the transmission of the pressure drop from one end to the other of the main pipe and having an expansion chamber, a third valve unit regulating the pressure rise in the brake cylinder responsive to pressure drop in the main pipe in cooperation with a pressure delivery valve means adapted to maintain a pre-determined minimum pressure in the pipe line to said brake cylinder, each valve unit having a resilient membrane defining primary and secondary chambers and movable responsive to pressure differences on both sides of said membrane, the set of primary chambers inter-communicating with the main pipe while the set of secondary chambers inter-communicates with the control tank, the second and third valve units each comprising a tertiary air-tight chamber separated by a flexible membrane from their primary chambers and communicating with the outer atmosphere through a valve adapted to be unseated when the brake is released, the automatic adjustment of each valve unit to variable operating conditions being effected by the difference of pressure between the primary and secondary chambers, the tertiary chamber of the regulating valve unit being in permanent communication with the brake cylinder and provided with a valve which, when pressure drops in the main pipe, automatically establishes communication between said tertiary chamber and the pressure tank and thus ensures a compressed air feed to the brake cylinder.

5. A fluid pressure brake system, including, a control device in piped communication with a main pressure supply pipe, a pressure tank, a control tank, and a brake cylinder; said control device, comprising, in combination, a valve unit equalizing accidental pressure leakages occurring in the main pipe, a second valve unit accelerating the transmission of the pressure drop from one end to the other of the main pipe and having an expansion chamber, and a third valve unit regulating the pressure rise in the brake cylinder responsive to pressure drop in the main pipe in cooperation with a pressure delivery valve means adapted to maintain a pre-determined minimum pressure in the pipe line to said brake cylinder, each valve unit having a resilient membrane defining primary and secondary chambers and movable responsive to pressure differences on both sides of said membrane, the set of primary chambers inter-communicating with the main pipe while the set of secondary chambers inter-communicates with the control tank, the equalizing valve unit establishing mutual communication between the pressure tank, control tank and main pipe when the brake is in released condition, the last-named valve unit having a bore which only allows pressure equalization between said tanks and said pipe in case of accidental compressed air leakage of the main pipe, said communication and the communication between the pressure tank and the control tank being automatically closed off as soon as said leakage exceeds a predetermined limit, the automatic adjustment of each valve unit to variable operating conditions being set by the difference of pressure between the primary and secondary chambers.

6. A fluid pressure brake system, including, a control device in piped communication with a main pressure supply pipe, a pressure tank, a control tank, and a brake cylinder; said control device, comprising, in combination, a valve unit equalizing accidental pressure losses occurring in the main pipe, a second valve unit accelerating the transmission of the pressure drop from one end to the other of the main pipe, a third valve unit regulating the pressure rise in the brake cylinder responsive to pressure drop in the main pipe in cooperation with a pressure delivery valve means adapted to maintain a pre-determined minimum pressure in the pipe line to said brake cylinder, and a fourth valve unit controlling the speed of the braking action, each valve unit having a resilient membrane defining primary and secondary chambers and movable responsive to pressure differences on both sides of said membrane, the set of primary chambers of the first three valve units communicating with the main pipe while the set of secondary chambers communicate with the control tank, the automatic adjustment of each of the first three valve units to variable operating conditions being set by the difference of pressure between their primary and secondary chambers, the primary chamber of the fourth valve unit being connected to the brake cylinder through a valve actuated by the regulating valve unit while its secondary chamber is connected with the outer atmosphere, a valve mounted on the compressed air feed aand automatically adjusted by the displacements of the membrane of the fourth valve unit in response to pressure differences on either side of its membrane, a duct having a gaged bore by-passing the last-named valve, and means for locking said last-named valve in open position.

7. A fluid pressure brake system, including, a control device in piped communication with a main pressure supply pipe, a pressure tank, a control tank, and a brake cylinder; said control device, comprising, in combination, a valve unit equalizing pressure losses occurring in the main pipe, a second valve unit accelerating the transmission of the pressure drop from one end to the other of the main pipe and including a compression chamber, a third valve unit regulating the pressure rise in the brake cylinder responsive to pressure drop in the main pipe in cooperation with a pressure delivery valve means adapted to maintain a pre-determined minimum pressure in the pipe line to said brake cylinder, a fourth valve unit controlling the speed of the braking action, and a fifth valve unit adjusting the filling time of the pressure tank by compressed air, each valve unit having flexible membrane defining primary and secondary chambers and shiftable responsive to pressure differences on both sides of said membrane, the set of primary chambers of the first three valve units inter-communicating with the main pipe while the set of secondary chambers inter-communicates with the control tank, the automatic adjustment of each of the first three valve units to variable operating conditions being effected by the difference of pressure between their primary and secondary chambers, and co-related control members operatively connected to the valve members of the third, fourth and fifth valve units to permit simultaneous setting thereof to selected adjustments, the primary chamber of the fourth valve unit being connected to the brake cylinder through a valve actuated by the regulating valve unit while its secondary chamber is connected with the outer atmosphere, a valve mounted on the compressed air feed and automatically adjusted by the displacements of the valve element of the fourth valve unit responsive to pressure differences on either side of its membrane, a duct having a gaged bore by passing the last-named valve, and means for locking said last-named valve in open position.

8. In a fluid pressure brake system, including a control device in piped communication with a main pressure supply pipe, a pressure tank, a control tank and a brake cylinder; said control device, comprising in combination at least three regulating valve units each containing a primary and secondary chamber formed by a double-acting valve element and a flexible partition movable in response to differential pressures in said chambers, the primary chambers of the valve units being interconnected and communicating with said main pipe, and the secondary chambers being interconnected and in communication with the control tank, whereby differences in pressure between the main pressure supply connected to the primary chambers and the control tank connected to the secondary chambers flex the said flexible partitions and actuate said double-acting valve units as a function of said pressure differences, one of the valve units comprising a third air-tight chamber separated by a resilient membrane from the primary chamber, said third chamber communicating with the brake cylinder, a pressure delivery valve unit, conduits leading therefrom and connected with a delivery conduit from said pressure tank at one end and a pair of chambers at the other end, conduits leading from said last-mentioned chambers into said third air-tight chamber of the brake connected valve unit, control valve means between the said pair of chambers adapted to regulate the delivery of fluid into the said brake control valve unit's third chamber and into said brake cylinder until a predetermined pressure is reached, whereby said brake control valve unit actuates the brake, and control valve means in said third chamber of the brake connected valve unit cooperating with the said double-acting valve element of the said unit, to thereby allow air under pressure to pass from the pressure tank by way of said delivery valve from the said air-tight chamber into the brake cylinder or from the same to the atmosphere through said movable valve-element according to the difference in pressure in the primary and secondary chambers of the aforementioned regulating valve units.

HANS GALLUSSER.